(No Model.)
C. H. THURBER & C. W. SCHAEFER.
CELLULOID ARTICLE AND PROCESS OF MANUFACTURING SAME.
No. 542,452. Patented July 9, 1895.
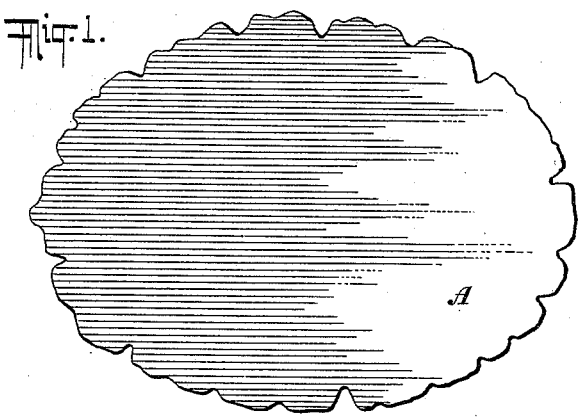
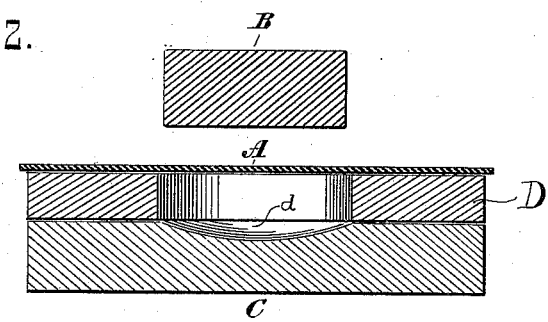
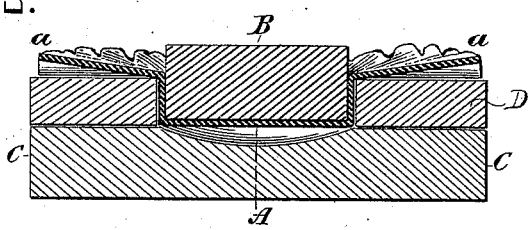
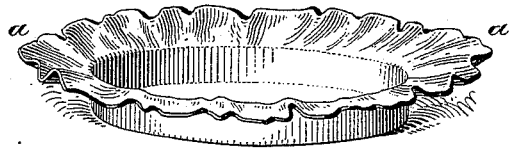
WITNESSES:
INVENTORS
Charles H. Thurber
Christian W. Schaefer
BY
ATTORNEYS

UNITED STATES PATENT OFFICE.

CHARLES H. THURBER, OF EAST ORANGE, AND CHRISTIAN W. SCHAEFER, OF NEWARK, ASSIGNORS TO THE CELLULOID COMPANY, OF NEWARK, NEW JERSEY.

CELLULOID ARTICLES AND PROCESS OF MANUFACTURING SAME.

SPECIFICATION forming part of Letters Patent No. 542,452, dated July 9, 1895.

Application filed October 19, 1894. Serial No. 526,352. (No specimens.)

*To all whom it may concern:*

Be it known that we, CHARLES H. THURBER, residing at East Orange, and CHRISTIAN W. SCHAEFER, residing at Newark, in the county of Essex, State of New Jersey, citizens of the United States, have invented a certain new and useful Improvement in Celluloid Articles and in the Process of Manufacturing the Same, of which the following is a full, true, and accurate description, reference being had to the accompanying drawings, wherein similar letters refer to corresponding parts in the several views.

The object of our invention is to speedily and economically produce articles—such as trays, receptacles, or dishes—of celluloid or similar pyroxyline compound, having an ornamented appearance when finished, and consists, principally, in the manner of working the celluloid so as to produce the ornamented articles.

Figure 1 is a view of a blank of celluloid intended to be worked into a tray. Fig. 2 illustrates a form of die which may be usefully employed, showing the blank of the die. Fig. 3 illustrates the sheet formed into the article in the die. Fig. 4 illustrates the article made from said blank.

In carrying out our invention we first cut or stamp out a blank A, which shall be large enough to be formed into the desired article and to have an outward flaring rim or flange $a\ a$ when so formed, and one requirement of our invention is that the edge of the aforesaid blank is to be cut with a view to the shape which the edge of the finished article is to have. By this preliminary step of our process we are enabled, as one of the results, to form ornamental articles of celluloid, the edges of which do not require any trimming after the article is formed. Another important result of this preliminary definement of the form of the edge is that the ornamentation of the flaring rim is greatly increased.

The next step in our process is to place the said blank in a die-press or mold or other manipulating apparatus to work it into the shape of the article. For this purpose we prefer to employ such a form of die as is shown in the accompanying drawings. The blank $a\ a$ rests upon the female die, made in two parts, the base C and the ring D, and this die is preferably heated when used and subsequently cooled before the celluloid article is removed therefrom. The plunger B is of such shape and so mounted in the apparatus as not to touch the portions of the blank which rest upon the female die. The parts of the die are then brought together, shaping the article between them, the air contained in the female die being forced into the chamber $d$. A flaring rim or border is left, which becomes during the pressing and cooling fluted or crinkled.

We have discovered that if a blank of celluloid of the desired shape be worked in dies of the character preferred by us—for instance, into a tray for holding hair-pins, jewelry, &c.—the stamped article will have a crinkled or fluted rim, due to the manipulation of the material and to the peculiar characteristics of the material, whereby a highly finished and ornamented appearance is given to it, such as it has not been possible to give to the rims of similar articles without the use of a die having the shape of the entire article to be produced, which necessitates having a separate die for each kind of ornamental rim, thus entailing a limited variety and great expense; and we have also discovered that the ornamental crinkling or fluting may be facilitated and the patterns diversified, if the shape of the edge of the blank be other than plain—for instance, scalloped or serrated—and that the best results are produced when a blank having a suitable irregular edge is used.

Another feature of the employment of our process is that the ornamentation of many of the articles differs slightly, even when blanks of apparently the same size, shape, and thickness be worked in the same dies, the crinkling or fluting of one article varying and being sometimes different from the fluting of another article made in the same die and from a precisely similar blank, while articles of sufficiently similar shape as to present the same general features of ornamentation are produced.

What we claim, and desire to secure by Letters Patent, is—

1. The process of manufacturing articles of celluloid or similar material, consisting in, first, serrating, or otherwise irregularly forming, the edge of the blank, and then subjecting the said blank to the action of dies to form the flaring crinkled rim or border of the finished article, substantially as described.

2. A finished dish or plate made of celluloid, or similar material, having a body and a flaring crinkled rim or border, the edge of said rim or border being serrated or otherwise irregularly formed, and having the same edge as that of the blank from which the dish or plate was formed, substantially as described.

CHARLES H. THURBER.
CHRISTIAN W. SCHAEFER.

In presence of—
F. N. CORWIN,
PHILIP ALEXANDER.